(12) United States Patent
Qualkenbush

(10) Patent No.: US 6,877,603 B2
(45) Date of Patent: Apr. 12, 2005

(54) STORAGE DEVICE FOR RELATIVELY THIN ARTICLES, SUCH AS CDS AND DVDS

(75) Inventor: Paul F. Qualkenbush, Chicago, IL (US)

(73) Assignee: Fellowes, Inc., Itasca, IL (US)

( * ) Notice: Subject to any disclaimer, the term of this patent is extended or adjusted under 35 U.S.C. 154(b) by 110 days.

(21) Appl. No.: 10/430,431

(22) Filed: May 7, 2003

(65) Prior Publication Data

US 2004/0222111 A1 Nov. 11, 2004

(51) Int. Cl.$^7$ .............................................. B65D 85/57
(52) U.S. Cl. .............................. 206/308.1; 206/308.3; 206/806; 220/481
(58) Field of Search ........................... 206/307.1, 308.1, 206/308.3, 309, 311, 39, 312, 472, 473, 806; 248/99, 100, 95, 215, 205.1, 317, 318, 339; 220/480–482; 281/29, 31, 36, 37, 38

(56) References Cited

U.S. PATENT DOCUMENTS

| | | | |
|---|---|---|---|
| 3,302,917 A | * | 2/1967 | Winkler ...................... 206/806 |
| 3,695,418 A | | 10/1972 | Gwozdz |
| 4,347,930 A | * | 9/1982 | Herrin ........................ 206/806 |
| 4,356,919 A | * | 11/1982 | Matney ...................... 206/806 |
| 4,620,630 A | | 11/1986 | Moss |
| 4,632,242 A | * | 12/1986 | Choi et al. .................. 206/806 |
| 4,838,709 A | * | 6/1989 | Guerriero et al. ......... 206/308.3 |
| 5,509,528 A | | 4/1996 | Weisburn |
| 5,653,335 A | | 8/1997 | Bauer et al. |
| 5,826,717 A | * | 10/1998 | Eskandry ................. 206/308.1 |
| 6,106,015 A | | 8/2000 | Udwin et al. |
| 6,244,444 B1 | | 6/2001 | Jacobus et al. |
| 6,481,182 B1 | | 11/2002 | Fuller |
| 2002/0157974 A1 | | 10/2002 | Krahn |
| 2002/0162758 A1 | | 11/2002 | Clemens |

* cited by examiner

Primary Examiner—Luan K. Bui
(74) Attorney, Agent, or Firm—Pillsbury Winthrop LLP

(57) ABSTRACT

The present application discloses a storage case/hanger combination that enables a storage case for storing relatively thin articles to be hung for display while still enabling the case to be opened for permitting users to inspect the case. The combination comprises a storage case including a pair of cover portions interconnected for movement relative to one another between a closed position closing an interior space of the case and an open position opening an interior space of the case. A plurality of pages are mounted within the interior space of the case. Each of these pages includes at least one pocket for receiving a relatively thin article therein. The pages may be configured to receive various thin articles, including but not limited to, CDs, DVDs, floppy disks, collectible cards (e.g., sports cards), stamps, etc. The combination also includes a hanger for hanging the case. The hanger includes (a) a hanger portion having an opening for receiving an object from which the case is to be hung and (b) an attachment portion removably attaching the hanger to the case at such a position that the cover portions can be moved relative to one another between the closed and open positions thereof without interference from the hanger.

10 Claims, 5 Drawing Sheets

STORAGE DEVICE FOR RELATIVELY THIN ARTICLES, SUCH AS CDS AND DVDS

FIELD OF THE INVENTION

The present invention relates to a storage device for relatively thin articles, such as CDs and DVDs.

BACKGROUND OF THE INVENTION

Conventional storage devices for CDs and DVDs are often encased in cardboard boxes or received inside cardboard sleeves. These boxes and sleeves typically have hanging part with an aperture therein for receiving a display hook for hanging the storage device on a display rack in a retail store. The problem with this conventional arrangement is that the potential purchaser cannot readily inspect the interior of the storage device without removing the device from its cardboard sleeve or box. This is an undesirable situation, as it often leads to potential purchasers damaging these cardboard sleeves or boxes. Also, it is suspected that sales may be lost, as some consumers may not be willing to buy a product they cannot fully inspect, and instead would opt to buy another product that can be fully inspected.

SUMMARY OF THE INVENTION

The present invention endeavors to provide an improved construction for enabling a storage device to be hung, yet also to be fully inspected by potential purchasers. One aspect of the present invention provides a storage case/hanger combination that enables a storage case for storing relatively thin articles to be hung for display while still enabling the case to be opened for permitting users to inspect the case. The combination comprises a storage case including a pair of cover portions interconnected for movement relative to one another between a closed position closing an interior space of the case and an open position opening an interior space of the case. A plurality of pages are mounted within the interior space of the case. Each of these pages includes at least one pocket for receiving a relatively thin article therein. The pages may be configured to receive various thin articles, including but not limited to, CDs, DVDs, floppy disks, collectible cards (e.g., sports cards), stamps, etc. The combination also includes a hanger for hanging the case. The hanger includes (a) a hanger portion having an opening for receiving an object from which the case is to be hung and (b) an attachment portion removably attaching the hanger to the case at such a position that the cover portions can be moved relative to one another between the closed and open positions thereof without interference from the hanger.

Other objects, features, and advantages of the present invention will become apparent from the following detailed description, the accompanying drawings, and the appended claims.

DETAILED DESCRIPTION OF THE ILLUSTRATED EMBODIMENT

Figure 1:
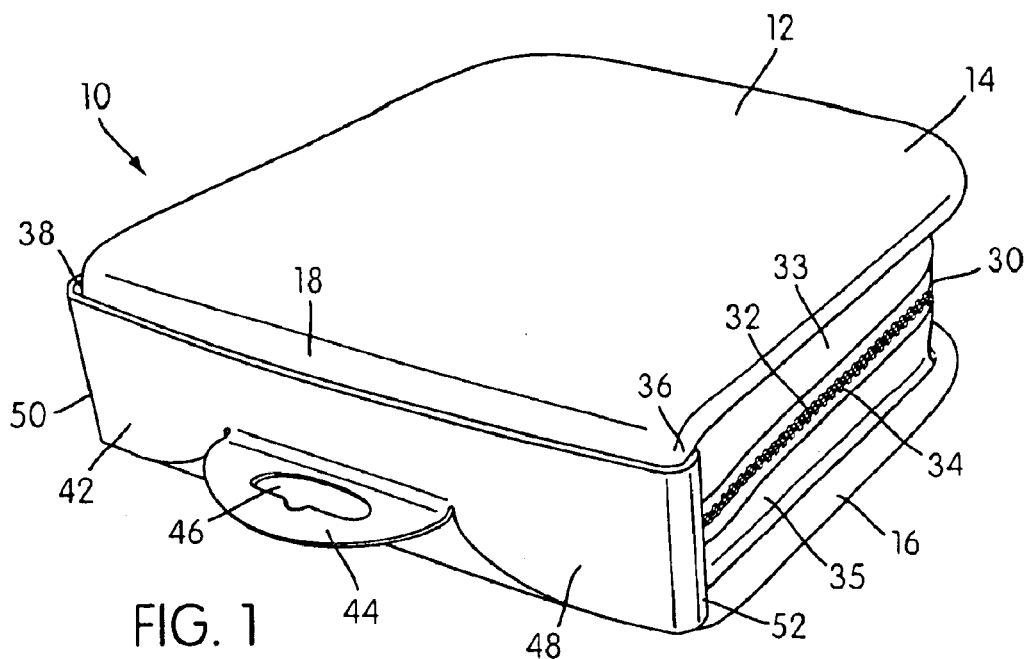
FIG. 1 is a perspective view of a storage case/hanger combination constructed in accordance with the principles of the present invention.

The Figures illustrate a storage case/hanger combination 10. The combination 10 comprises a case 12 including a pair of cover portions 14, 16 interconnected for movement relative to one another between a closed position (see FIGS. 1–5 and 8) closing an interior space of the case 12 and an open position (see FIG. 6) opening an interior space of the case 12. In the illustrated embodiment, the cover portions 14, 16 are interconnected by a spine 18, which allows the cover portions 14, 16 to open and close in a fashion similar to a book. The cover portions 14, 16 and spine 18 may be made from any material and may have any suitable configuration. For example, the cover portions 14, 16 may be made of a high rigidity plastics material or be padded internally and/or externally to withstand impacts or both. The configuration illustrated in the Figures is in no way intended to be limiting and the invention is intended encompass cases having any construction or configuration.

A plurality of pages 20 are mounted within the interior space of the case 12. Each of these pages 20 includes at least one pocket 22 for receiving a relatively thin article therein. The pages 20 and their pockets 22 may be configured to receive various thin articles, including but not limited to, CDs, DVDs, floppy disks, collectible items, (e.g., sports cards or stamps) etc. In the illustrated embodiment, the pages 20 are constructed particularly for storing CDs and DVDs (i.e., optically readable storage media). Each page 20 includes a central sheet 24 with a pair of pocket forming sheets 26 adhered, heat welded, stitched or otherwise affixed to the opposing faces of the central sheet 24 along three outer edges thereof—the fourth, undulated edge is left free to define an opening 28 for inserting/removing CDs and/or DVDs from the pocket 22. The pages 20 may be affixed to the interior surface of the spine 18 in any suitable manner. For example, in the illustrated embodiment, the central sheet 24 is provided with two pairs of pocket forming sheets 26 at the opposing ends thereof, thus providing a pair of pockets 22 at each end. These sheets 24 are laid flat in a stack atop the spine 18 and a set of fasteners attach the middle sections of these sheets 24 to the spine 18. This also separates each sheet 24 into two pages 20, each with its own pair of pockets 22. It should be understood, however, that the pages 20 may have any construction and configuration and the embodiment illustrated is in no way intended to be limiting.

The case 12 further comprises a zipper closure 30 of conventional construction including (a) a pair of interlocking structures, illustrated in the form of zipper teeth 32, 34, extending about the cover portions 14, 16 from one end portion proximate one lateral peripheral edge 36 of the spine 18 to another end portion proximate the opposite lateral peripheral edge 38 of the spine 18. The interlocking structures 32 are interlockable in a conventional fashion to secure the cover portions 14, 16 in the closed position thereof and releasable to enable movement of the cover portions 14, 16 to the open position thereof. The zipper closure 30 also includes a web 33, 35 on each cover portion 14, 16 extending around the peripheries thereof, with the interlocking structures 32, 34 being provided on the webs 33, 35. A zipper 40 is movable along the interlocking structures 32, 34 between the end portions thereof for interlocking and releasing the interlocking structures 32, 34 from one another. The zipper 40 has a small lanyard 41 for facilitating pulling the zipper 40 along the interlocking structures 32, 34. Specifically, movement of the zipper 40 in the direction running from the end portion at the spine lateral edge 36 to the end portion at the spine lateral edge 38 will cause interlocking of the interlocking structures 32, 34 in a conventional fashion; and conversely, movement of the zipper 40 in the opposite direction will release the interlocking structures 32, 34 in a conventional fashion. Zipper closures with interlocking structures other than teeth, such as a single continuous seal, may be used as an alternative. Further, the present invention may be practiced with any construction for releasably securing the cover portions 14, 16 in the closed position thereof, and in no way is the illustrated embodiment intended to be limiting in this respect.

The storage case/hanger combination 10 also includes a hanger 42 for hanging the case 12. The hanger 42 includes (a) a hanger portion 44 having an opening 46 for receiving an object from which the device 10 is to be hung (e.g., a display hook in a retail store) and (b) an attachment portion 48 removably attaching the hanger 42 to the case 12 at such a position that the cover portions 14, 16 can be moved relative to one another between the closed and open positions thereof without interference from the hanger 42. Because the case 12 can be opened without interference from the hanger 42, this permits a potential purchaser of the case 12 to fully inspect the case 12, including its interior and the pages 20, without having to remove the hanger 42.

The hanger 48 maybe removably attached to the case 12 in any suitable matter and in any suitable position wherein the case 12 can be opened without interference by the hanger 42. In the illustrated embodiment, the attachment portion 48 includes one or more clip portions 50, 52 removably attached to the peripheral edge of the case 12. Any number of clip portions may be used, and they may be removably attached at any points along the case's peripheral edge (which is the edge extending around the edges of cover portions 14, 16 and the spine 18). As can be seen best in FIG. 6, in the illustrated embodiment, the attachment portion 48 extends along the outer side of the spine 18 and includes two clip portions 50, 52 removably attached to the lateral peripheral edges 36, 38 of the spine 18. These clip portions 50, 52 are created by folding over the end portions of the attachment portion 48 about 180 degrees. However, any other construction may be used and the term "clip portion" is intended to encompass any structure that releasably affixes to the case 12.

Figure 6:
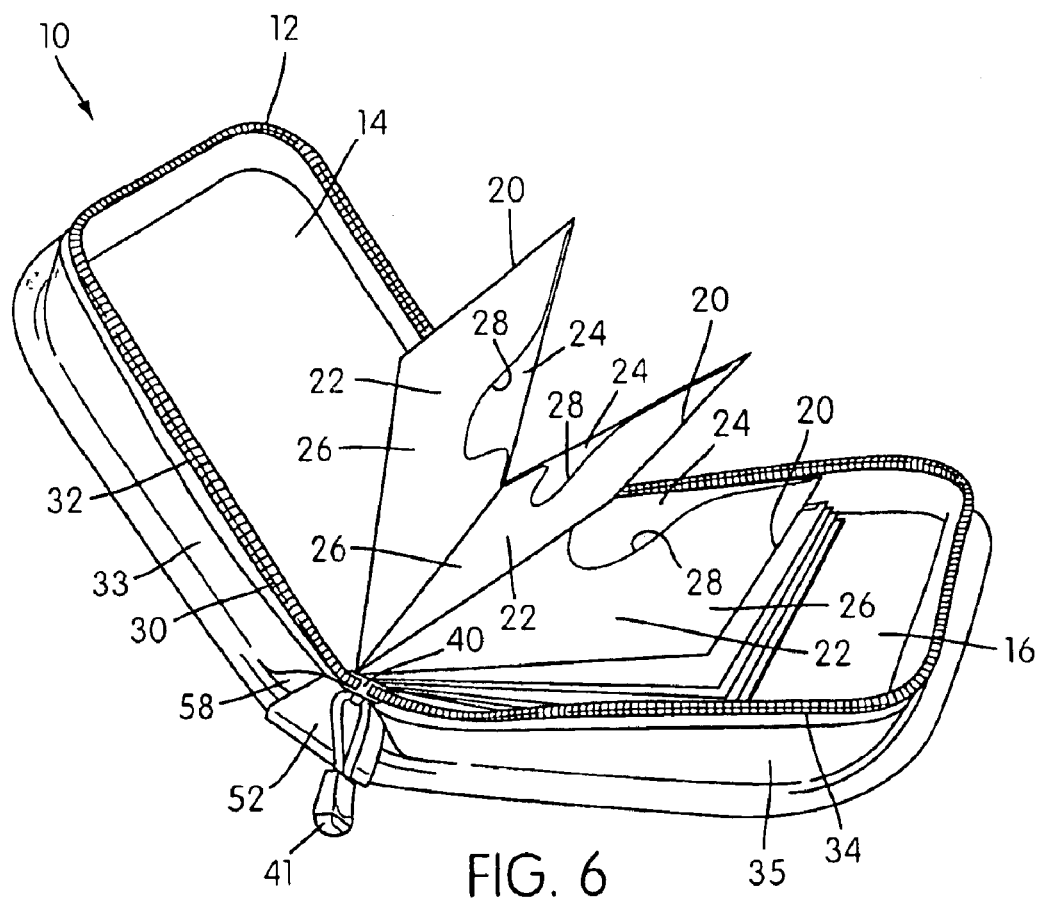
FIG. 6 is a perspective view showing the case of the combination opened.
Figure 7:
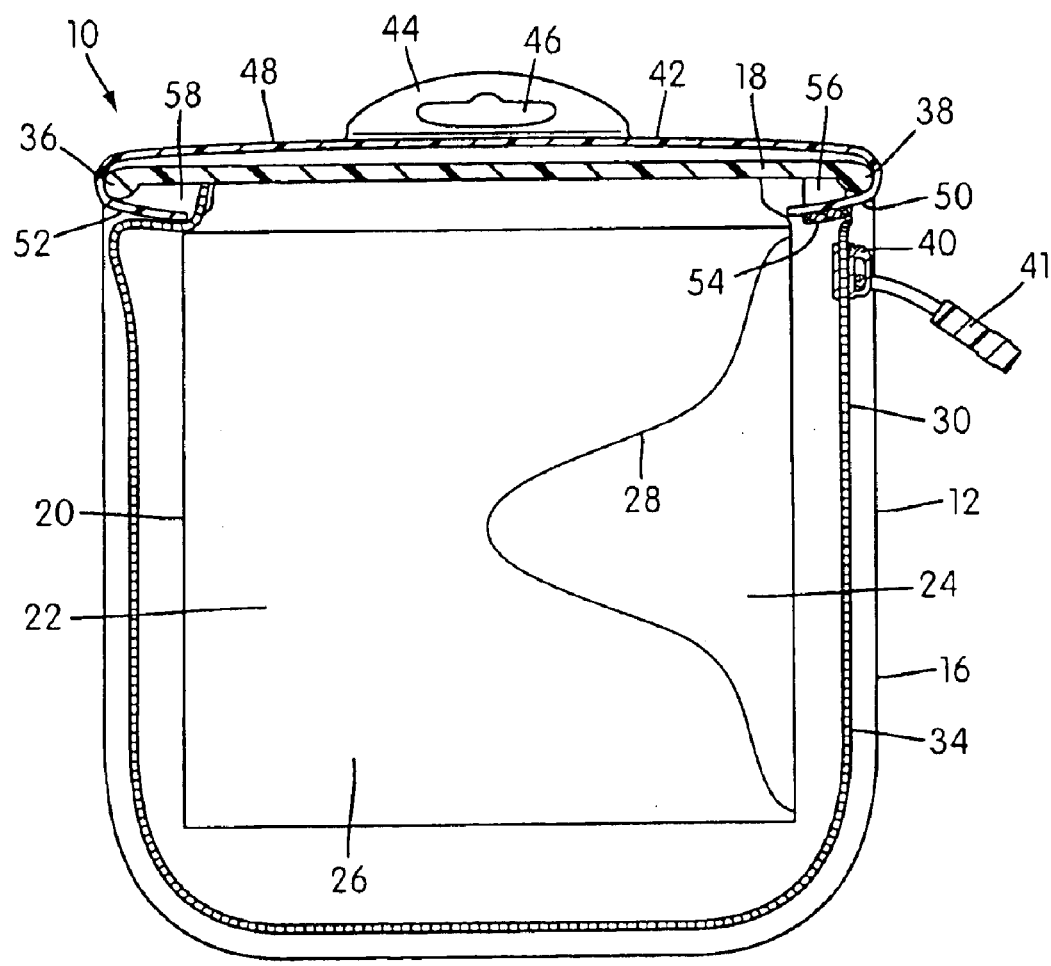
FIG. 7 is a cross-sectional view taken along line 7—7 of FIG. 5.
Figure 8:
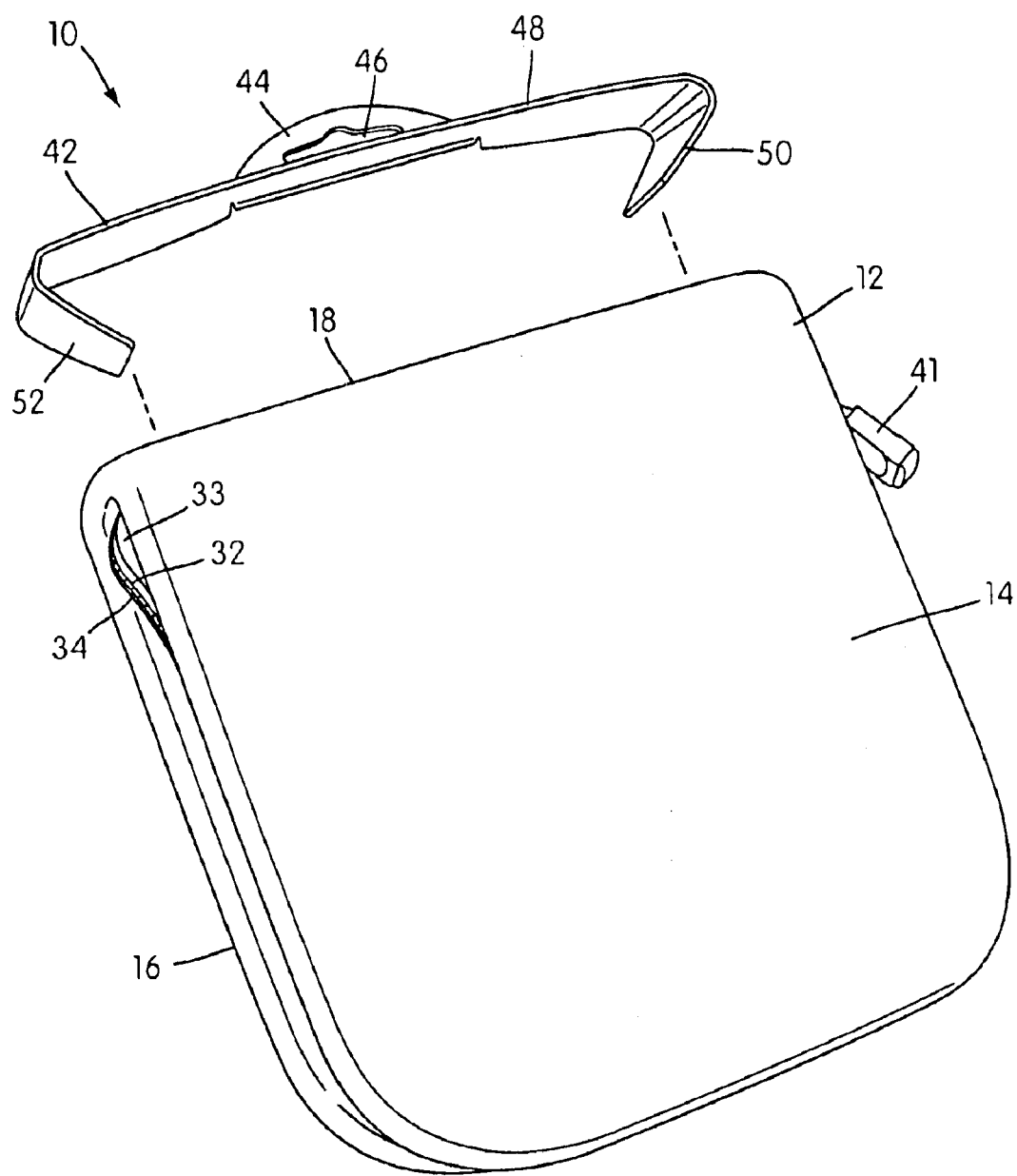
FIG. 8 is a perspective view of the device of FIG. 1 with the hanger being removed from the case.

As can be seen in the cross-sectional view of FIG. 6, the spine 18 includes a clip receiving member 54 on an inner side thereof proximate the lateral peripheral edge 38. The clip receiving member 54 is in the form of a flexible fabric strip attached at its opposing ends by stitching, adhesion, fasteners, or any other suitable way to the inner surface of the spine 18. The strip, along with the inner surface of the spine 18, defines a first clip receiving space 56. Additionally, the interlocking structures 32, 34 are initially interlocked at the end portion thereof adjacent lateral peripheral edge 36 in a configuration forming a second clip receiving space 58 between the interlocking structures 32, 34 and the inner surface of the spine 18. In the illustrated embodiment, at the end portion of the zipper closure 30 adjacent lateral peripheral edge 36, the webs 33, 35 are angled inwardly toward the inner surface of the spine 18 to form the second clip receiving space 58 between the zipper closure 30 and the inner surface of the spine 18.

Figure 2:
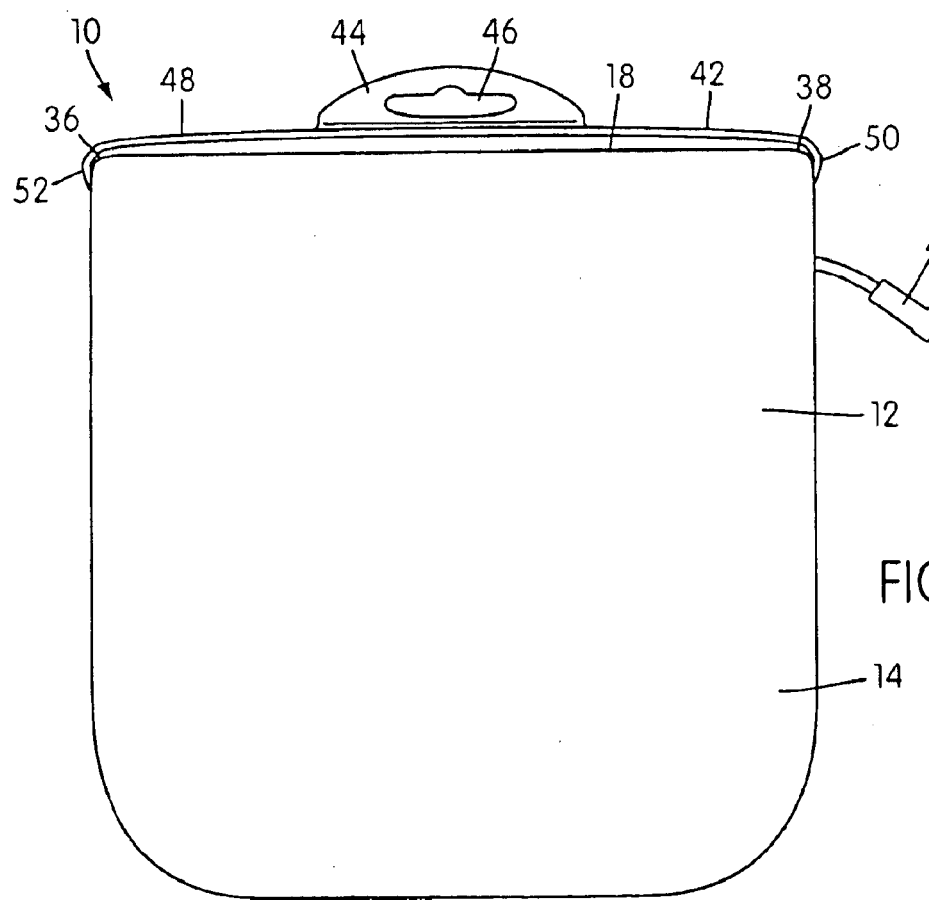
FIG. 2 is an elevated front view of the combination of FIG. 1.
Figure 3:
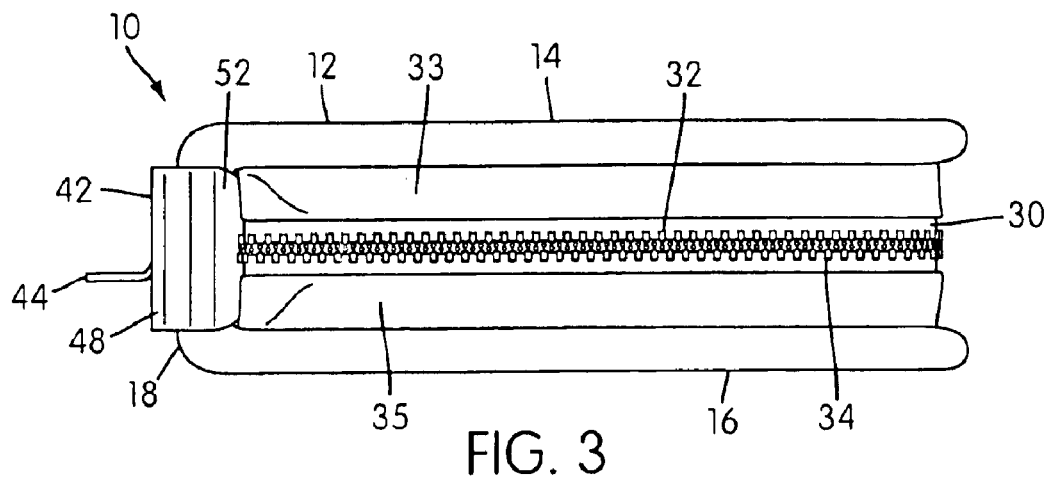
FIG. 3 is a left side profile view of the combination of FIG. 1.
Figure 4:
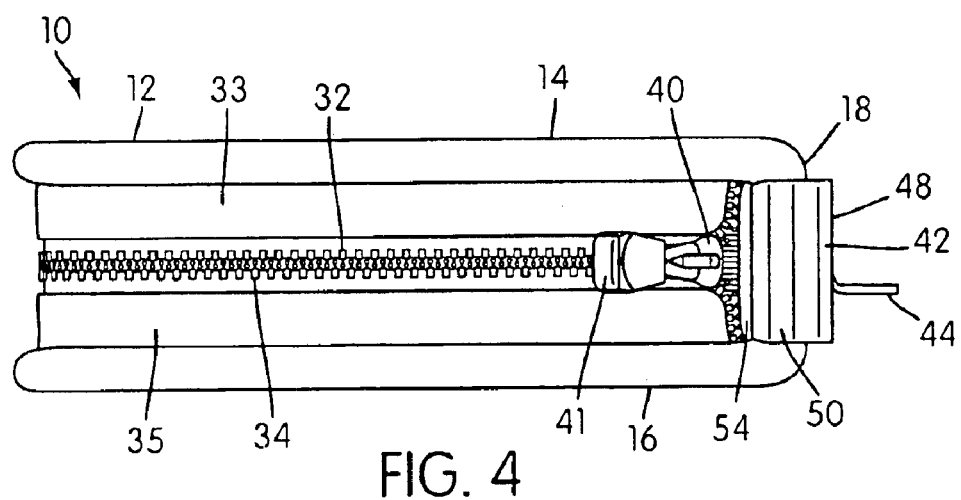
FIG. 4 is a right side profile view of the combination of FIG. 1.
Figure 5:
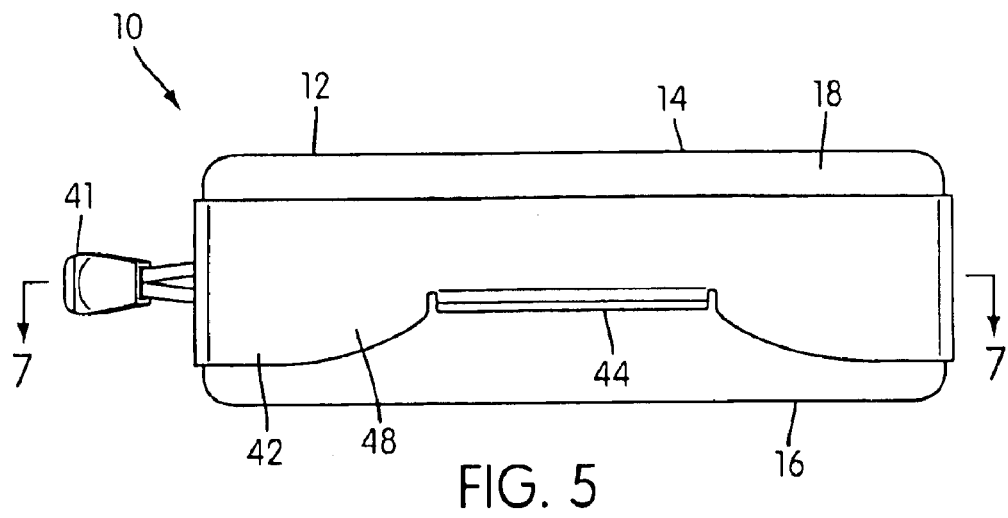
FIG. 5 is a top plan view of the combination of FIG. 1.

A first of the two clip portions, clip portion 50, is removably attached to the lateral peripheral edge 38 by extending along the inner side of the spine 18 into the first clip receiving space 56, as is shown in FIG. 6. A second of the two clip portions, clip portion 52, is removably attached to the lateral peripheral edge 36 by extending along the inner side of the spine 18 into the second clip receiving space 58, as is also shown in FIG. 6. Specifically, each of these clip portions 50, 52 is folded about 180 degrees from the main portion of the attachment portion 48 so as to extend along the inner surface of the spine 18 and into the clip receiving spaces 54, 56. To remove the hanger 48, the purchaser can pull the clip portions 50, 52 out of these clip receiving spaces 54, 56. Preferably, the hanger 48 is made from a semi-rigid plastics material whereby there is enough flexibility to enable the clip portions 50, 52 to be removed from the clip receiving spaces 54, 56, yet enough rigidity so that the main portion of the attachment portion 48 does not "bow" significantly under the weight of the case 12 held by the clip portions 50, 52 when hung on a display hook or other object. The term "bow" refers to the attachment portion 48 flexing into an arcuate configuration by the weight of the case pulling the clip portions 50, 52 downwardly while the hanger portion 44 remains on the display hook so that the center portion of the spine 18 becomes separated from the center portion of the attachment portion 48. Some bowing is shown in FIG. 2; however, this amount is considered insubstantial.

Generally, the attachment portion 48 may have any construction and configuration suitable for removable attachment anywhere on the case 12. For example, the attachment portion 48 could be configured to attach to structures on the outer surface of the spine 18, or to any parts of the case 12 in general. Further, the hanger 42 may be made out of any material and have any configuration, and need not be made from the semi-rigid plastic discussed above.

The foregoing embodiment has been provided solely for the purpose of illustrating the structural and functional principles of the present invention and is not intended to be limiting. To the contrary, the present invention is intended to encompass all modifications, substitutions, and/or alterations within the spirit and scope of the following claims.

What is claimed:

1. A storage case/hanger combination comprising:
   a storage case including a pair of cover portions interconnected for movement relative to one another between a closed position closing an interior space of the case and an open position opening an interior space of the case;
   a plurality of pages mounted within the interior space of the case, each page including at least one pocket for receiving a relatively thin article therein; and
   a hanger for hanging the case, the hanger including (a) a hanger portion having an opening for receiving an object from which the case is to be hung and (b) an attachment portion removably attaching the hanger to the case at such a position that the cover portions can be moved relative to one another between the closed and open positions thereof without interference from the hanger;
   wherein the case includes a peripheral edge, the attachment portion including one or more clip portions removably attached to the peripheral edge;
   wherein the case includes a spine interconnecting the cover portions, the peripheral edge including first and second opposing lateral peripheral edges of the spine, the attachment portion extending along the spine and including two of the clip portions each removably attached to the lateral peripheral edges of the spine.

2. A storage case/hanger combination according to claim 1, wherein the spine includes one or more clip receiving members including a clip receiving member on an inner side thereof proximate the first lateral peripheral edge thereof, the clip receiving member defining a clip receiving space and a first of the two clip portions being removably attached to the first lateral peripheral edge by extending along the inner side of the spine into the first clip receiving space.

3. A storage case/hanger combination according to claim 2, wherein the case further comprises a zipper closure including (a) a pair of interlocking structures extending about the cover portions from one end portion proximate the first lateral peripheral edge of the spine to another end portion proximate the second lateral peripheral edge of the spine, the interlocking structures being interlockable to secure the cover portions in the closed position thereof and releasable to enable movement of the cover portions to the open position thereof and (b) a zipper movable along the interlocking structures between the end portions thereof for interlocking and releasing the interlocking structures from one another, the interlocking structures being initially interlocked at the one end portion thereof in a configuration forming a second clip receiving space between the interlocking structures and the inner surface of the spine, a second of the two clip portions being removably attached to the second lateral peripheral edge by extending along the inner side of the spine into the second clip receiving space.

4. A storage case/hanger combination according to claim 3, wherein the zipper closure includes a web on each cover portion extending around the peripheries thereof, the interlocking portions of the zipper closure being provided on the webs.

5. A storage case/hanger combination according to claim 4, wherein at the one end portion of the zipper closure the webs are angled inwardly toward the inner surface of the spine to form the second clip receiving space.

6. A storage case/hanger combination comprising:
a storage case including a pair of cover portions interconnected for movement relative to one another between a closed position closing an interior space of the case and an open position opening an interior space of the case;
a plurality of pages mounted within the interior space of the case, each page including at least one pocket for receiving a relatively thin article therein; and
a hanger for hanging the case, the hanger including (a) a hanger portion having an opening for receiving an object from which the case is to be hung and (b) an attachment portion removably attaching the hanger to the case at such a position that the cover portions can be moved relative to one another between the closed and open positions thereof without interference from the hanger;
wherein the case includes a spine interconnecting the cover portions, the attachment portion being removably attached to the spine;
wherein the spine has first and second opposing lateral peripheral edges, the attachment portion extending along the spine and including first and second clip portions removably attached to the first and second lateral peripheral edges of the spine, respectively.

7. A storage case/hanger combination according to claim 6, wherein the spine includes one or more clip receiving members including a clip receiving member on an inner side thereof proximate the first lateral peripheral edge thereof, the clip receiving member defining a clip receiving space and the first clip portion being removably attached to the first lateral peripheral edge by extending along the inner side of the spine into the first clip receiving space.

8. A storage case/hanger combination according to claim 7, wherein the case further comprises a zipper closure including (a) a pair of interlocking structures extending about the cover portions from one end portion proximate the first lateral peripheral edge of the spine to another end portion proximate the second lateral peripheral edge of the spine, the interlocking structures being interlockable to secure the cover portions in the closed position thereof and releasable to enable movement of the cover portions to the open position thereof and (b) a zipper movable along the interlocking structures between the end portions thereof for interlocking and releasing the interlocking structures from one another, the interlocking structures being initially interlocked at the one end portion thereof in a configuration forming a second clip receiving space between the interlocking structures and the inner surface of the spine, the second clip portions being removably attached to the second lateral peripheral edge by extending along the inner side of the spine into the second clip receiving space.

9. A storage case/hanger combination according to claim 8, wherein the zipper closure includes a web on each cover portion extending around the peripheries thereof, the interlocking portions of the zipper closure being provided on the webs.

10. A storage case/hanger combination according to claim 9, wherein at the one end portion of the zipper closure the webs are angled inwardly toward the inner surface of the spine to form the second clip receiving space.

\* \* \* \* \*